(12) United States Patent
Tartz et al.

(10) Patent No.: US 9,436,280 B2
(45) Date of Patent: Sep. 6, 2016

(54) SIMULATION OF THREE-DIMENSIONAL TOUCH SENSATION USING HAPTICS

(75) Inventors: Robert S. Tartz, San Diego, CA (US); Bennett M. King, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 537 days.

(21) Appl. No.: 12/683,669

(22) Filed: Jan. 7, 2010

(65) Prior Publication Data

US 2011/0163946 A1    Jul. 7, 2011

(51) Int. Cl.
*G06F 3/01* (2006.01)
(52) U.S. Cl.
CPC ..................... *G06F 3/016* (2013.01)
(58) Field of Classification Search
CPC ............. G06F 3/04; G06F 3/04; G06F 3/016
USPC .......................... 345/156, 173–178
See application file for complete search history.

(56) References Cited

U.S. PATENT DOCUMENTS

| | | | |
|---|---|---|---|
| 5,512,919 A | 4/1996 | Araki | |
| 7,592,901 B2* | 9/2009 | Furusho | 340/407.1 |
| 2003/0146898 A1 | 8/2003 | Kawasaki et al. | |
| 2007/0146312 A1* | 6/2007 | Tsai et al. | 345/156 |
| 2009/0088220 A1 | 4/2009 | Persson | |
| 2009/0106655 A1* | 4/2009 | Grant et al. | 715/702 |
| 2009/0217187 A1* | 8/2009 | Kendall et al. | 715/765 |
| 2009/0280860 A1* | 11/2009 | Dahlke | 455/556.1 |
| 2010/0017759 A1* | 1/2010 | Birnbaum et al. | 715/863 |
| 2010/0037167 A1* | 2/2010 | Son | G06F 3/0486 715/769 |
| 2013/0314354 A1 | 11/2013 | Heubel et al. | |

FOREIGN PATENT DOCUMENTS

| | | |
|---|---|---|
| CN | 1166125 A | 11/1997 |
| CN | 1983125 A | 6/2007 |
| JP | H05282095 A | 10/1993 |
| JP | H1133937 A | 2/1999 |
| JP | 2001022267 A | 1/2001 |
| JP | 2002333823 A | 11/2002 |
| JP | 2003300188 A | 10/2003 |
| JP | 2004205962 A | 7/2004 |
| KR | 20090064968 A | 6/2009 |
| KR | 20100072219 A | 6/2010 |
| WO | 2009112971 A2 | 9/2009 |

OTHER PUBLICATIONS

International Search Report and Written Opinion—PCT/US2011/020571—ISA/EPO—Apr. 7, 2011.
"Source-Independent Virutal Motion Chair", IBM Technical Disclosure Bulletin, International Business Machines Corp. (Thornwood), US, vol. 39, No. 7, Jul. 1, 1996, p. 161/162, XP000627962, ISSN: 0018-8689 the whole document.
Taiwan Search Report—TW100100712—TIPO—Aug. 30, 2013.

* cited by examiner

*Primary Examiner* — Alexander Eisen
*Assistant Examiner* — Cory Almeida
(74) *Attorney, Agent, or Firm* — Charles E. Eggers

(57) ABSTRACT

An apparatus includes a processing system, a display, and a plurality of haptic actuators. The display and the haptic actuators are coupled to the processing system. The processing system is configured to control the haptic actuators to simulate movement in a particular direction corresponding to movement in the particular direction in a visual depiction in the display.

38 Claims, 7 Drawing Sheets

SIMULATION OF THREE-DIMENSIONAL TOUCH SENSATION USING HAPTICS

BACKGROUND

1. Field

The following description relates generally to haptics and, more particularly, to an apparatus and a method for simulating a three-dimensional (3D) touch sensation using haptics.

2. Background

Haptic actuators are readily available on most handheld devices and typically render haptic feedback in response to a touch event on a touch-enabled display, as a notification, or as a gaming effect on haptic-enabled games. Although virtual 3D graphical user interfaces and games exist on handhelds, there is currently no known method of simulating a 3D touch sensation such that the user experiences a haptic response in the x, y, and z planes that correspond to a graphical 3D object moving in the same virtual planes. A handheld device with a virtual 3D user interface (or virtual 3D game) could benefit by enhancing the realism and sensation of three dimensions by creating the illusion of depth using haptic actuators. As such, there is a need in the art for an apparatus and a method for simulating a 3D touch sensation using haptics.

SUMMARY

In an aspect of the disclosure, an apparatus includes a processing system, a display coupled to the processing system, and a plurality of haptic actuators coupled to the processing system. The processing system is configured to control the haptic actuators to simulate movement in a particular direction corresponding to movement in the particular direction in a visual depiction in the display.

In an aspect of the disclosure, a method of an apparatus includes providing a visual depiction in a display and controlling a plurality of haptic actuators corresponding to the visual depiction in order to simulate a movement in the visual depiction.

In an aspect of the disclosure, an apparatus includes means for providing a visual depiction in a display, and means for controlling a plurality of haptic actuators corresponding to the visual depiction in order to simulate a movement in the visual depiction.

In an aspect of the disclosure, a computer program product includes a computer-readable medium. The computer-readable medium includes code for providing a visual depiction in a display and for controlling a plurality of haptic actuators corresponding to the visual depiction in order to simulate a movement in the visual depiction.

In an aspect of the disclosure, an apparatus includes a processing system, a display coupled to the processing system, and a plurality of haptic actuators coupled to the processing system. The processing system is configured to provide a visual depiction in the display, and to control the haptic actuators corresponding to the visual depiction in order to simulate a movement in the visual depiction.

DETAILED DESCRIPTION

Various aspects of the novel systems, apparatus and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that that the scope of disclosure is intended to cover any aspect of the novel systems, apparatus and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Examples of apparatuses suitable for incorporating various aspects of the invention include, but are not limited to, a UE capable of operating in a wireless network. A UE may be referred to as a mobile phone, user terminal, a mobile station, a mobile device, a subscriber station, a wireless device, a terminal, an access terminal, a node, a handheld device, or some other suitable terminology. The various concepts described throughout this disclosure are intended to apply to all suitable apparatuses regardless of their specific nomenclature.

Figure 1:
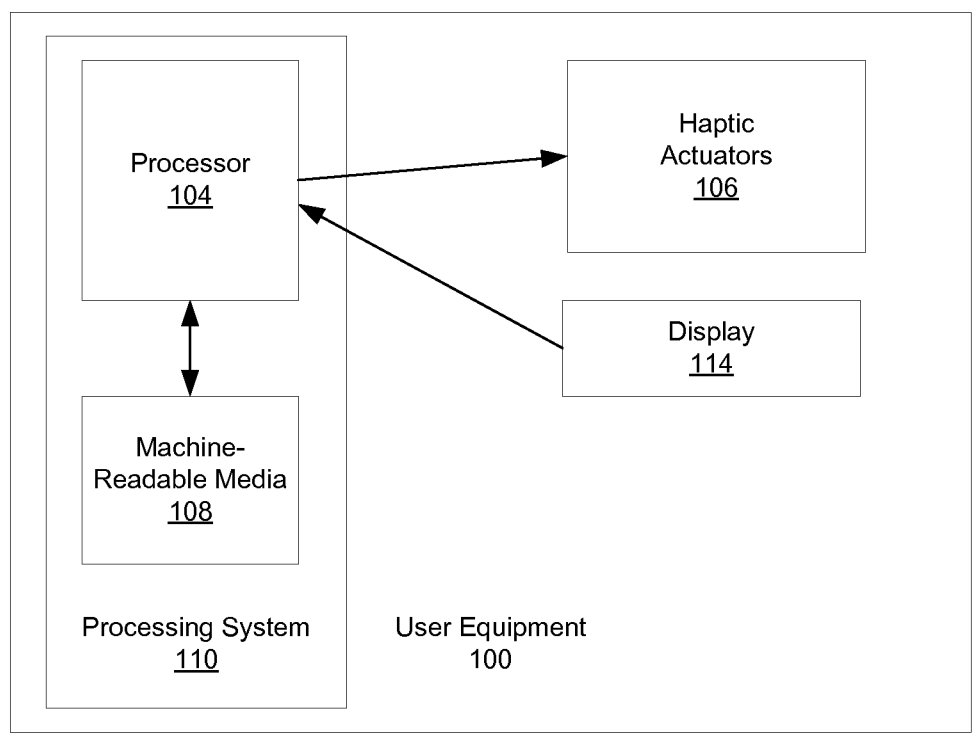
FIG. 1 is a conceptual block diagram illustrating a hardware configuration for an exemplary apparatus.

Various aspects of an apparatus will now be presented with reference to FIG. 1. FIG. 1 is a conceptual block diagram illustrating a hardware configuration for an apparatus. The apparatus 100 includes a processor 104, machine-readable media (memory) 108 coupled to the processor 104, a plurality of haptic actuators 106 coupled to the processor 104, and a display 114 coupled to the processor 104. The processor 104 and the machine-readable media 108 may together be referred to as a processing system 110. However, the processing system 110 may include the processor 104 without the machine-readable media 108 for certain processor 104 configurations.

The processing system 110 may include one or more processors. The one or more processors may be implemented with any combination of general-purpose microprocessors, microcontrollers, a Digital Signal Processors (DSP), Field Programmable Gate Arrays (FPGA), Programmable Logic Devices (PLD), controllers, state machines, gated logic, discrete hardware components, or any other suitable entities that can perform calculations or other manipulations of information.

The processing system 110 may also include the machine-readable media 108 for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 110 to perform the various functions described below, as well as other protocol processing functions.

The machine-readable media 108 may include storage integrated into one or more of the processors. The machine-readable media 108 may also include storage external to the one or more processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, the machine-readable media 108 may include a transmission line or a carrier wave that encodes a data signal. Those skilled in the art will recognize how best to implement the described functionality for the processing system.

The haptic actuators 106 provide feedback to a user of the UE 100 through a user's cutaneous sense or kinesthetic sense. The haptic actuators 106 may provide vibration, texture, temperature, or other touch feedback to a user through a user's cutaneous sense. The haptic actuators 106 may be electroactive polymer actuators, piezoelectric actuators, electrostatic surface actuators, Peltier elements, or other actuators/devices for providing vibration, texture, or temperature feedback. Alternatively or in addition, the haptic actuators 106 may provide a force feedback to a user through a user's kinesthetic sense. To provide force feedback, each of the haptic actuators 106 may include a mass that may be moved in one of two directions with a particular acceleration or velocity. The moving mass provides feedback of a force to a user by causing the UE 100 to move in a particular direction corresponding to the direction of the force. A user may then sense through muscle movement the direction and amplitude of the force.

Figure 2:
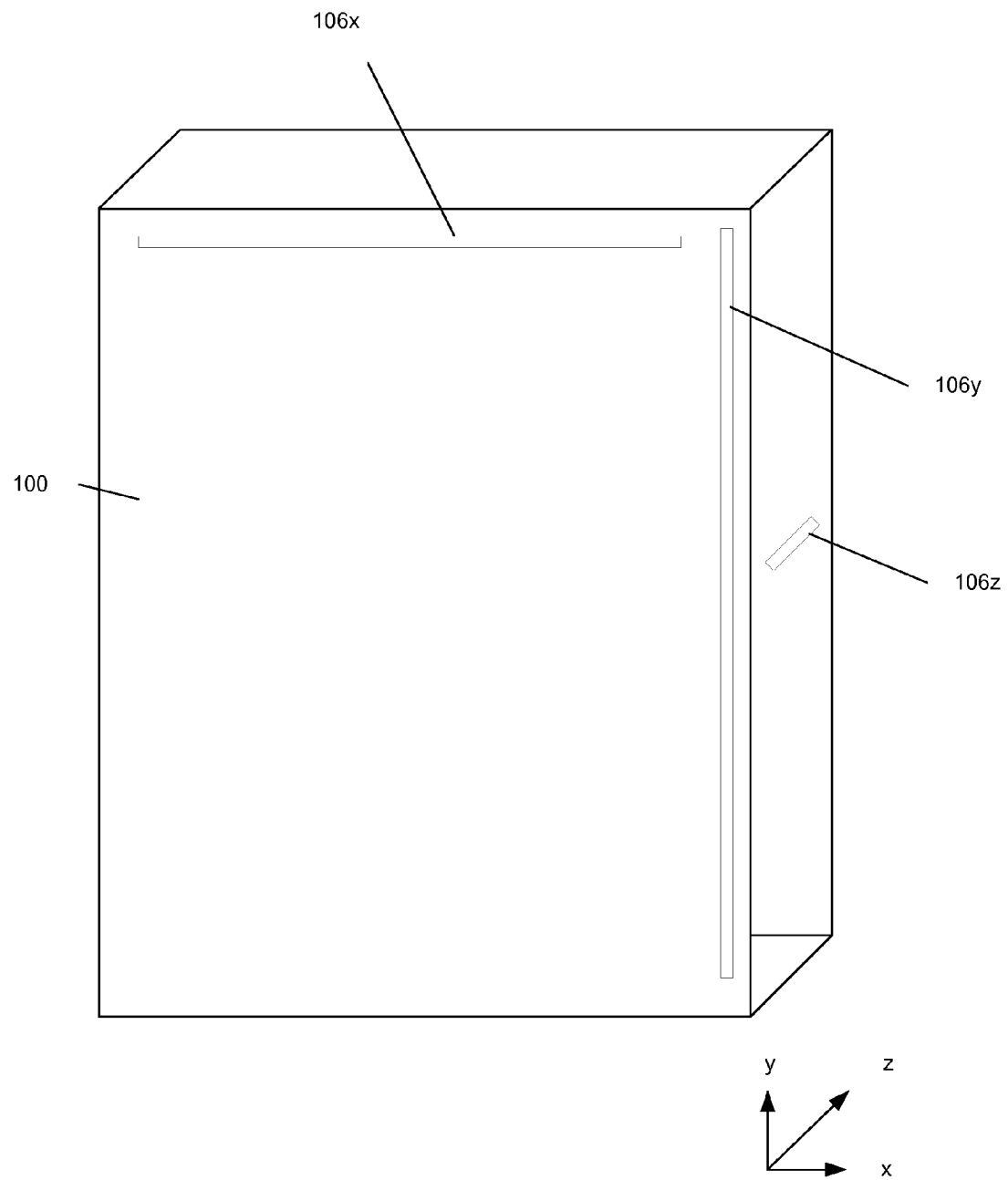
FIG. 2 is a conceptual diagram illustrating a user equipment (UE) with a plurality of haptic actuators.

FIG. 2 is a conceptual diagram illustrating a UE 100 with a plurality of haptic actuators 106x, 106y, 106z. The UE 100 may include at least two of the haptic actuators 106x, 106y, 106z in order to provide feedback in at least two dimensions. The haptic actuator 106x is oriented in the x direction, the haptic actuator 106y is oriented in the y direction, and the haptic actuator 106z is oriented in the z direction. The haptic actuators 106x, 106y, 106z each provide a force feedback. The haptic actuators oriented in the x, y, and z directions allow for a combined force feedback to be provided in any direction by controlling the haptic actuators simultaneously. As mentioned supra, the haptic actuators may provide force feedback and each may include a mass that can be moved in a particular direction with a particular velocity or acceleration. In such a configuration, the haptic actuators 106x, 106y, 106z may be controlled to provide a force feedback in any combination of the x, y, and z directions by simultaneously moving a mass associated with each of the haptic actuators 106x, 106y, 106z.

Figure 3:
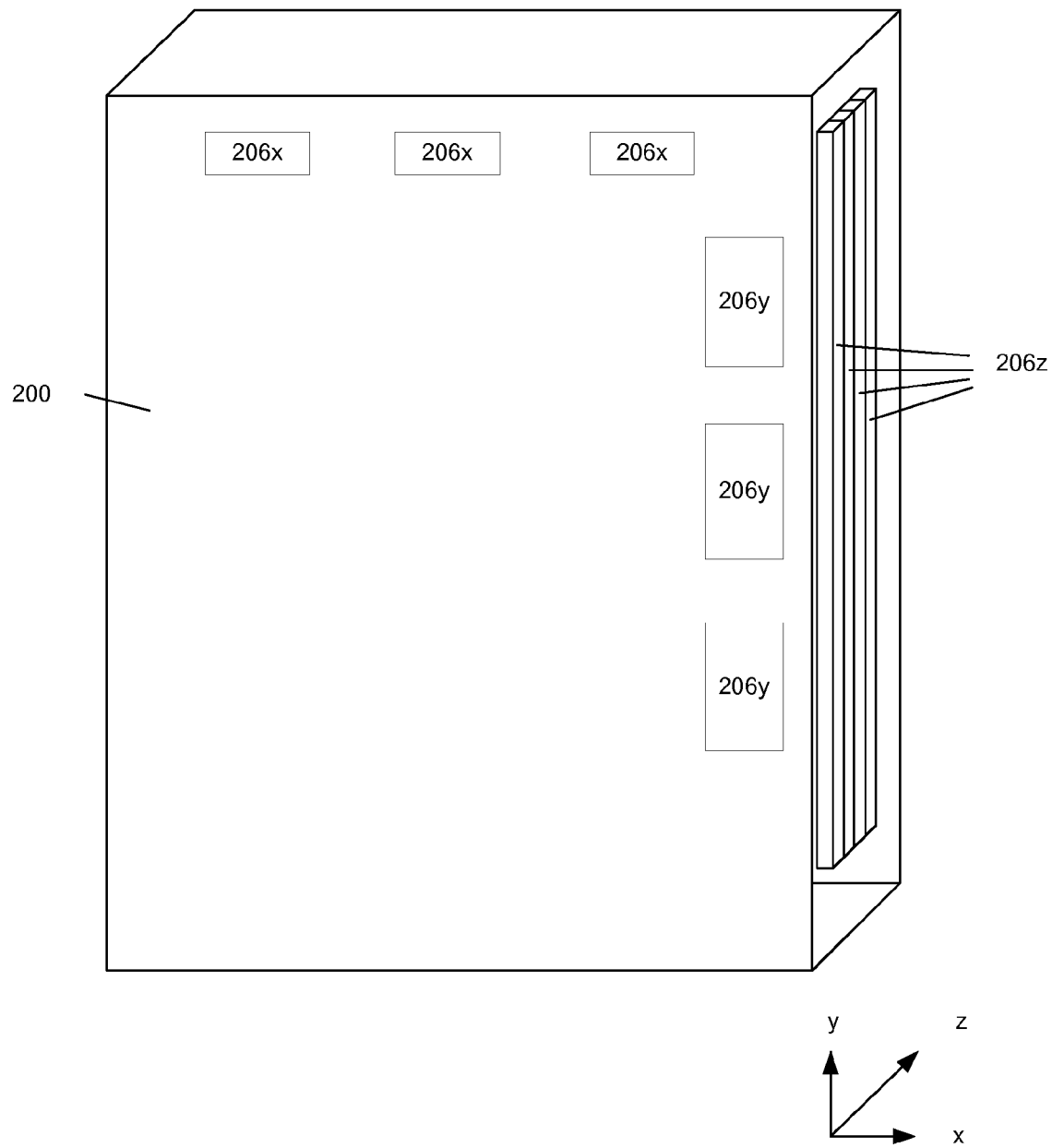
FIG. 3 is another conceptual diagram illustrating a UE with a plurality of haptic actuators.

FIG. 3 is a conceptual diagram illustrating a UE 200 with a plurality of haptic actuators 206x, 206y, 206z. As shown in FIG. 3, the haptic actuators are layered in the x, y, and z directions, with haptic actuators 206x layered in the x direction, haptic actuators 206y layered in the y direction, and haptic actuators 206z layered in the z direction. To indicate a particular direction, the haptic actuators can be activated and deactivated sequentially in the particular direction. A particular direction may also be indicated by activating the haptic actuators concurrently and modifying an amplitude of each of the haptic actuators with increasing or decreasing amplitude in the particular direction. For example, with respect to the haptic actuators 206z, the amplitude of the top-most actuator (experienced as a vibration, texture, temperature, or another touch sensation) could be varied such that the haptic response is greatest when a virtual 3D object appears closest to the virtual front of the display (i.e., appears closest to the user). As the virtual 3D object appears to move away from the user in the virtual z-direction, the amplitude of the top-most haptic actuator could gradually attenuate and the middle or bottom-most haptic actuator(s) could gradually amplify, thus creating the illusion of haptic depth as the 3D object appears to move away from the front and toward the middle or back of the display. The amplitude and timing of actuation for all the actuators may be synchronized for the best illusion of haptic depth as the virtual 3D object appears to move from the front to the back of the display. Timing delays between activation/deactivation and/or synchronized amplitude adjustments can simulate the time it takes for a 3D object to move from the virtual front to the virtual back of the display. For example, a virtual 3D object could be "pushed" to the virtual back causing only the back-most actuator to actuate when the virtual 3D object arrives at the virtual back, thus simulating the haptic experience of a virtual bump against the back wall.

As shown in FIG. 3, the UE 100 includes haptic actuators for indicating movement in each of the x, y, and z directions, therefore allowing for the haptic actuators to simulate movement in any combination of the x, y, and z directions. In such a configuration, the haptic actuators may be excited in series with fluctuating amplitude to create the illusion of motion and depth in three planes that correspond to a moving 3D object. That is, the haptic actuators 206x, 206y, 206z may be utilized concurrently to provide combined feedback, such as for example, to indicate movement from a top, right, and front corner of the UE 200 to a bottom, left, and back corner of the UE 200. Such a change in the amplitude coupled with a direction of the vibratory feedback could indicate, for example, a small snow ball rolling down a hill and increasing in mass as it acquires additional snow.

Figure 4:
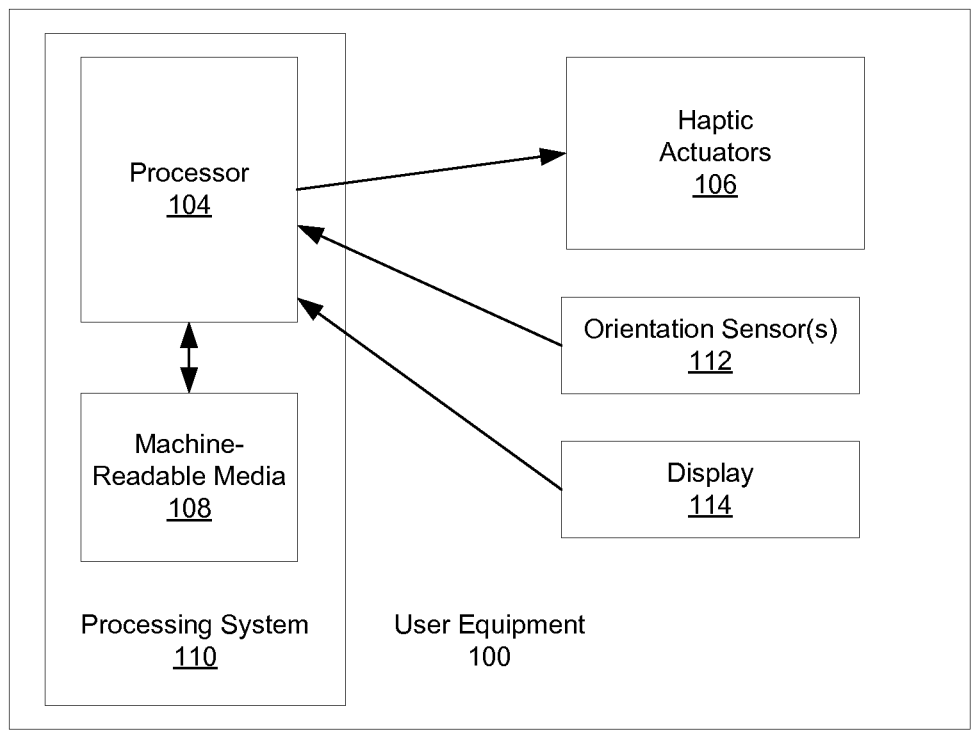
FIG. 4 is another conceptual block diagram illustrating a hardware configuration for an exemplary apparatus.

FIG. 4 is another conceptual block diagram illustrating a hardware configuration for an exemplary apparatus. The UE 100 may further include one or more orientation sensors 112 coupled to the processor 104. The orientation sensors 112 may include a gyroscope. Alternatively or in addition, the orientation sensors 112 may include level sensors and a compass. Furthermore, the orientation sensors 112 may include an inclinometer for measuring the tilt, elevation, or inclination of the UE 100 with respect to gravity. The orientation sensors 112 provide information to the processor 104 on the particular orientation of the UE 100. The processor 104 may use the orientation information to determine how to control the haptic actuators 106. That is, the processor 104 may be configured to control the haptic actuators 106 to provide feedback corresponding to the orientation of the UE 100 or to modify a feedback provided corresponding to the display based on the orientation of the UE 100.

When the haptic actuators provide force feedback, the force feedback may be modified depending on the orientation of the UE 100. For example, the processor 104 may be configured to control the haptic actuators 106 to provide a particular force feedback in coordination with the display, and may be further configured to modify the provided force feedback based on the orientation of the UE 100 provided by the orientation sensors 112. As such, the processor 104 may be configured to provide a force feedback with a particular direction, velocity, and/or acceleration in coordination with a 3D display. In addition, the processor 104 may be configured to adjust the provided force feedback by changing the direction, velocity, and/or acceleration of the force feedback based on the particular orientation of the UE 100. Such a configuration could be useful to indicate a particular direction to follow on a path without requiring that the UE 100 be held in a particular orientation. For example, a force feedback may be provided to a user to indicate a forward direction while the UE 100 is held in any orientation in the user's pocket.

Figure 5:
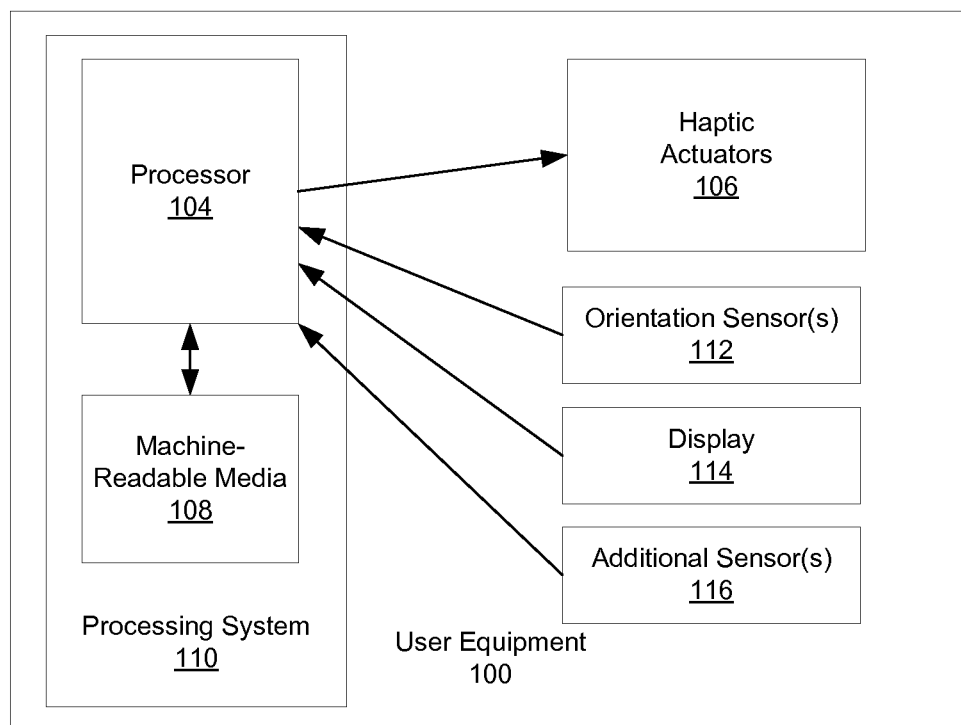
FIG. 5 is yet another conceptual block diagram illustrating a hardware configuration for an exemplary apparatus.

FIG. 5 is yet another conceptual block diagram illustrating a hardware configuration for an exemplary apparatus. The UE 100 may further include additional sensors 116 such as one or more cameras, heat sensors, touch sensors, and/or proximity sensors coupled to the processor 104. The additional sensors 116 sense the environment and relay information to the processor 104. The processor 104 may control or modify the control of the haptic actuators 106 corresponding to the provided sensed information from the additional sensors 116. For example, the additional sensors 116 may determine how the UE 100 is being carried, whether in the right hand, left hand, or the pocket, and on which side the user closest, and control the haptic actuators 106 to provide feedback in the direction of the user. In another example, the processor 104 may provide haptic feedback in coordination with a depiction in the display 114 and modify the direction of the feedback depending on whether the UE 100 is held in the left hand or right hand, such as how a mouse can be converted between left hand activation and right hand activation.

Figure 6:
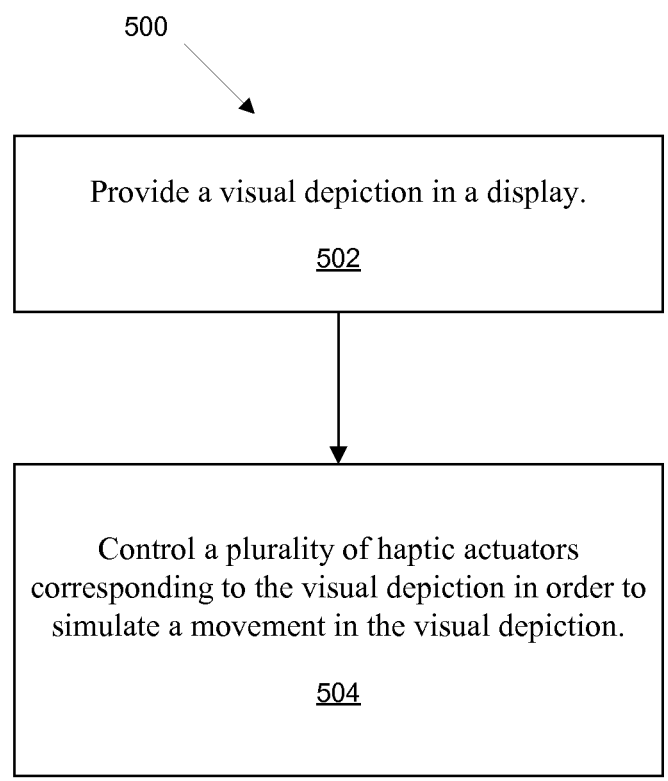
FIG. 6 is a flow chart of an exemplary method.

FIG. 6 is a flow chart 500 of an exemplary method. The method includes providing a visual depiction in a display (502). In addition, the method includes controlling a plurality of haptic actuators corresponding to the visual depiction in order to simulate a movement in the visual depiction (504). In one configuration, the haptic actuators are layered in a first direction. In one configuration, the controlling in step 504 comprises synchronizing the haptic actuators by sequentially activating and deactivating each of the haptic actuators in the first direction in order to simulate the movement in the first direction in the visual depiction. In one configuration, the controlling in step 504 comprises synchronizing the haptic actuators by changing an amplitude of a haptic output of each of the haptic actuators in an order in which the haptic actuators are layered in the first direction in order to simulate the movement in the first direction in the visual depiction. In one configuration, a first set of the haptic actuators simulates movement in a first direction and a second set of the haptic actuators simulates movement in a second direction approximately perpendicular to the first direction. Furthermore, the controlling in step 504 comprises controlling the first set and the second set of the haptic actuators concurrently to simulate a two-dimensional (2D) movement in a particular direction in the visual depiction. The particular direction is a combination of at least one of the first direction and the second direction.

In another configuration, a third set of haptic actuators simulates movement in a third direction approximately perpendicular to the first direction and to the second direction. In addition, the controlling in step 504 comprises controlling the third set of the haptic actuators concurrently with the first set and the second set of the haptic actuators to simulate a 3D movement in the particular direction in the visual depiction. The particular direction is a combination of at least one of the first direction, the second direction, and the third direction.

In one configuration, the first set, the second set, and the third set of the haptic actuators each include at least two layered haptic actuators. In another configuration, the haptic actuators provide at least one of a vibration, a force, a texture, or a temperature feedback.

Figure 7:
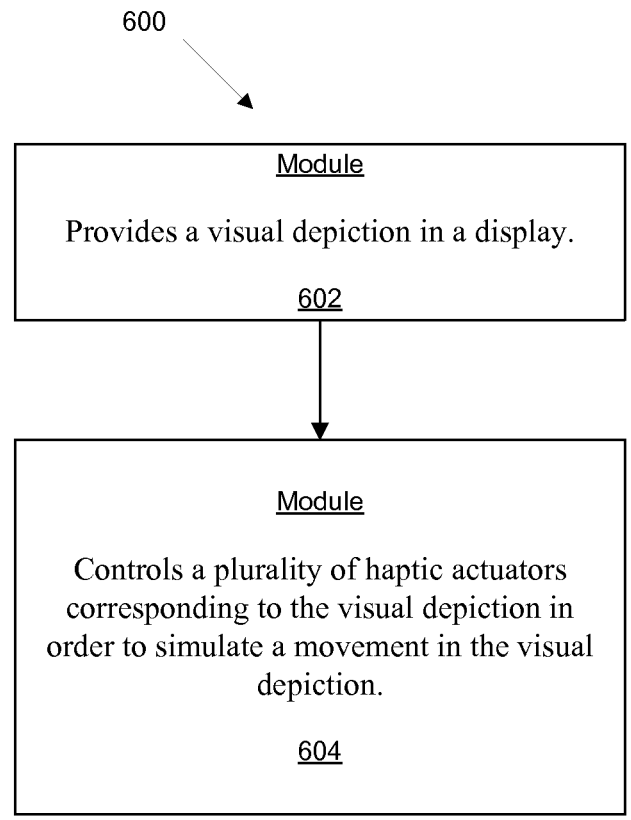
FIG. 7 is a modular diagram of an exemplary apparatus.

FIG. 7 is a modular diagram 600 of an exemplary apparatus. The exemplary apparatus may be UE 100 or UE 200. The exemplary apparatus includes a module 602 that provides a visual depiction in a display. The exemplary apparatus further includes a module 604 that controls a plurality of haptic actuators corresponding to the visual depiction in order to simulate a movement in the visual depiction. The module 602 and the module 604 is the processing system 110. A display is coupled to the processing system. In addition, a plurality of haptic actuators are coupled to the processing system. The processing system is configured to control the haptic actuators to simulate movement in a particular direction corresponding to movement in the particular direction in a visual depiction in the display.

In one configuration, a first set of the haptic actuators simulates movement in a first direction and a second set of the haptic actuators simulates movement in a second direction approximately perpendicular to the first direction. The processing system is configured to control the first set and the second set of the haptic actuators to simulate 2D movement in any combination of the first direction and the second direction. For example, if the first direction is the x direction and the second direction is the y direction, then the haptic actuators can simulate 2D movement in any direction in the xy plane.

In one configuration, a third set of the haptic actuators simulates movement in a third direction approximately perpendicular to the first direction and the second direction. The first, second, and third sets of haptic actuators may each include only one haptic actuator, such as shown in FIG. 2 related to haptic actuators that provide force feedback. Alternatively, the first, second, and third sets of haptic actuators may each include a plurality of layered haptic actuators, such as shown in FIG. 3 that provide vibration, texture, temperature, or other touch feedback. The processing system is configured to control the first set, the second set, and the third set of the haptic actuators to simulate 3D movement in any combination of the first direction, the second direction, and the third direction.

In one configuration, the haptic actuators are layered in each of the first direction, the second direction, and the third direction. Each of the first set, the second set, and the third set of the haptic actuators include at least two haptic actuators. In one configuration, the processing system is configured to synchronize an actuation and an amplitude of each of the haptic actuators in order to simulate the movement in the particular direction in the visual depiction in the display. In one configuration, the haptic actuators provide at least one of a vibration, a force, a texture, or a temperature feedback.

In one configuration, the exemplary apparatus further includes at least one orientation sensor coupled to the processing system. In such a configuration, the processing system is further configured to control the haptic actuators corresponding to information provided by the at least one orientation sensor in order to indicate the particular direction.

In one configuration, an apparatus (UE 100 or UE 200) includes means for providing a visual depiction in a display and means for controlling a plurality of haptic actuators corresponding to the visual depiction in order to simulate a movement in the visual depiction. The aforementioned means is the processing system 110 configured to perform the function identified in each of the aforementioned means. Specifically, the aforementioned means in the processor 104 configured to perform the function identified in each of the aforementioned means.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. An apparatus that is a handheld device, comprising:
   a housing;
   a processing system in the housing;
   a display associated with the housing and coupled to the processing system;
   a plurality of haptic actuators associated with the housing and coupled to the processing system, wherein at least one of the haptic actuators is capable of providing a temperature feedback; and
   an environmental sensor configured to provide signals to the processing system indicative of a location of the handheld device relative to the user,
   wherein the processing system is configured to control a movement of an object in a particular direction in the display, to control the haptic actuators in coordination with the movement of the object in the display to thereby provide a haptic feedback in the particular direction, and to modify the particular direction based on signals from the environmental sensor so that haptic feedback comprising temperature feedback is provided in the modified direction based on the location of the handheld device relative to the user.

2. The apparatus of claim 1, wherein a first set of the haptic actuators simulates movement in a first direction and a second set of the haptic actuators simulates movement in a second direction approximately perpendicular to the first direction, wherein the processing system is configured to control the first set and the second set of the haptic actuators to simulate two-dimensional movement in any combination of the first direction and the second direction.

3. The apparatus of claim 2, wherein a third set of the haptic actuators simulates movement in a third direction approximately perpendicular to the first direction and the second direction, wherein the processing system is configured to control the first set, the second set, and the third set of the haptic actuators to simulate three-dimensional movement in any combination of the first direction, the second direction, and the third direction.

4. The apparatus of claim 3, wherein the haptic actuators are layered in each of the first direction, the second direction, and the third direction, wherein each of the first set, the second set, and the third set of the haptic actuators comprise at least two haptic actuators.

5. The apparatus of claim 1, wherein:
   the housing comprises a front side and a back side opposite the front side;
   the display is associated with the front side and comprises a virtual front and a virtual back;
   the plurality of haptic actuators are in a layered arrangement between the front side and the back side; and
   the processing system is configured to control a movement of the object from the virtual front of the display to the virtual back of the display and to synchronize an actuation and an amplitude of each of the haptic actuators in coordination with the movement of the object from the virtual front of the display to the virtual back of the display such that the amplitude of the actuator closest to the front side is greater than the amplitude of the actuator closest to the back side when the object is at the virtual front of the display, and the amplitude of the actuator closest to the front side attenuates while the amplitude of the actuator closest to the back side amplifies as the object moves away from the virtual front of the display toward the virtual back of the display.

6. The apparatus of claim 1, wherein the haptic actuators provide at least one of a vibration, a force, or a texture feedback.

7. A method performed by a handheld device, comprising:
   providing a visual depiction of an object in a display associated with a housing of the handheld device;
   providing signals indicative of a location of the handheld device relative to the user; and controlling a movement of the object in a particular direction in the display, controlling a plurality of haptic actuators associated with the housing in coordination with the movement of the object in the display to thereby provide a haptic feedback in the particular direction, and modifying the particular direction based on signals from the environmental sensor so that haptic feedback comprising temperature feedback is provided in the modified direction based on the location of the handheld device relative to the user, wherein at least one of the haptic actuators is capable of providing a temperature feedback.

8. The method of claim 7, wherein the haptic actuators are layered in a first direction.

9. The method of claim 8, wherein the controlling comprises synchronizing the haptic actuators by sequentially activating and deactivating each of the haptic actuators in the first direction in order to simulate the movement in the first direction in the visual depiction.

10. The method of claim 8, wherein the controlling comprises synchronizing the haptic actuators by changing an amplitude of a haptic output of each of the haptic actuators in an order in which the haptic actuators are layered in the first direction in order to simulate the movement in the first direction in the visual depiction.

11. The method of claim 7, wherein a first set of the haptic actuators simulates movement in a first direction and a second set of the haptic actuators simulates movement in a second direction approximately perpendicular to the first direction, wherein the controlling comprises controlling the first set and the second set of the haptic actuators concurrently to simulate a two-dimensional movement in a particular direction in the visual depiction, the particular direction being a direction comprising a combination of at least one of the first direction and the second direction.

12. The method of claim 11, wherein a third set of haptic actuators simulates movement in a third direction approximately perpendicular to the first direction and to the second direction, wherein the controlling further comprises controlling the third set of the haptic actuators concurrently with the first set and the second set of the haptic actuators to simulate a three-dimensional movement in the particular direction in the visual depiction, the particular direction being a direction comprising a combination of at least one of the first direction, the second direction, and the third direction.

13. The method of claim 12, wherein the first set, the second set, and the third set of the haptic actuators each include at least two layered haptic actuators.

14. The method of claim 7, wherein the haptic actuators provide at least one of a vibration, a force, or a texture feedback.

15. An apparatus that is a handheld device, comprising:
means for providing a visual depiction of an object in a display associated with a housing of the handheld device;
means for providing signals indicative of a location of the handheld device relative to the user; and
means for controlling a movement of the object in a particular direction in the display, controlling a plurality of haptic actuators associated with the housing in coordination with the movement of the object in the display to thereby provide a haptic feedback in the particular direction, and modifying the particular direction based on signals from the environmental sensor so that haptic feedback comprising temperature feedback is provided in the modified direction based on the location of the handheld device relative to the user, wherein at least one of the haptic actuators is capable of providing a temperature feedback.

16. The apparatus of claim 15, wherein the haptic actuators are layered in a first direction.

17. The apparatus of claim 16, wherein the means for controlling synchronizes the haptic actuators by sequentially activating and deactivating each of the haptic actuators in the first direction in order to simulate the movement in the first direction in the visual depiction.

18. The apparatus of claim 16, wherein the means for controlling synchronizes the haptic actuators by changing an amplitude of a haptic output of each of the haptic actuators in an order in which the haptic actuators are layered in the first direction in order to simulate the movement in the first direction in the visual depiction.

19. The apparatus of claim 15, wherein a first set of the haptic actuators simulates movement in a first direction and a second set of the haptic actuators simulates movement in a second direction approximately perpendicular to the first direction, wherein the means for controlling controls the first set and the second set of the haptic actuators concurrently to simulate a two-dimensional movement in a particular direction in the visual depiction, the particular direction being a direction comprising a combination of at least one of the first direction and the second direction.

20. The apparatus of claim 19, wherein a third set of haptic actuators simulates movement in a third direction approximately perpendicular to the first direction and to the second direction, wherein the means for controlling controls the third set of the haptic actuators concurrently with the first set and the second set of the haptic actuators to simulate a three-dimensional movement in the particular direction in the visual depiction, the particular direction being a direction comprising a combination of at least one of the first direction, the second direction, and the third direction.

21. The apparatus of claim 20, wherein the first set, the second set, and the third set of the haptic actuators each include at least two layered haptic actuators.

22. The apparatus of claim 15, wherein the haptic actuators provide at least one of a vibration, a force, or a texture feedback.

23. A non-transitory computer program product for a handheld device, comprising:
a computer-readable medium comprising code for:
providing a visual depiction of an object in a display associated with a housing of the handheld device; and
controlling a movement of the object in a particular direction in the display, controlling a plurality of haptic actuators associated with the housing in coordination with the movement of the object in the display to thereby provide a haptic feedback in the particular direction, and modifying the particular direction based on signals indicative of a location of the handheld device relative to the user provided by an environmental sensor so that haptic feedback comprising temperature feedback is provided in the modified direction based on the location of the handheld device relative to the user, wherein at least one of the haptic actuators is capable of providing a temperature feedback.

24. The computer program product of claim 23, wherein the haptic actuators are layered in a first direction.

25. The computer program product of claim 24, wherein the code for controlling synchronizes the haptic actuators by sequentially activating and deactivating each of the haptic actuators in the first direction in order to simulate the movement in the first direction in the visual depiction.

26. The computer program product of claim 24, wherein the code for controlling synchronizes the haptic actuators by changing an amplitude of a haptic output of each of the haptic actuators in an order in which the haptic actuators are layered in the first direction in order to simulate the movement in the first direction in the visual depiction.

27. The computer program product of claim 23, wherein a first set of the haptic actuators simulates movement in a first direction and a second set of the haptic actuators simulates movement in a second direction approximately perpendicular to the first direction, wherein the code for controlling controls the first set and the second set of the haptic actuators concurrently to simulate a two-dimensional movement in a particular direction in the visual depiction, the particular direction being a direction comprising a combination of at least one of the first direction and the second direction.

28. The computer program product of claim 27, wherein a third set of haptic actuators simulates movement in a third direction approximately perpendicular to the first direction and to the second direction, wherein the code for controlling controls the third set of the haptic actuators concurrently with the first set and the second set of the haptic actuators to simulate a three-dimensional movement in the particular direction in the visual depiction, the particular direction being a direction comprising a combination of at least one of the first direction, the second direction, and the third direction.

29. The computer program product of claim 28, wherein the first set, the second set, and the third set of the haptic actuators each include at least two layered haptic actuators.

30. The computer program product of claim 23, wherein the haptic actuators provide at least one of a vibration, a force, or a texture feedback.

31. An apparatus that is a handheld device, comprising:
a housing;
a processing system in the housing;
a display associated with the housing and coupled to the processing system;
a plurality of haptic actuators associated with the housing and coupled to the processing system, wherein at least one of the haptic actuators is capable of providing a temperature feedback; and
an environmental sensor configured to provide signals to the processing system indicative of a location of the handheld device relative to the user,
wherein the processing system configured to:
provide a visual depiction of an object in the display;
control a movement of an object in a particular direction in the display, control the haptic actuators in coordination with the movement of the object in the display thereby provide a haptic feedback in the particular direction, and to modify the particular direction based on signals from the environmental sensor so that haptic feedback comprising temperature feedback is provided in the modified direction based on the location of the handheld device relative to the user.

32. The apparatus of claim 31, wherein the haptic actuators are layered in a first direction.

33. The apparatus of claim 32, wherein to control the haptic actuators, the processing system is configured to synchronize the haptic actuators by sequentially activating and deactivating each of the haptic actuators in the first direction in order to simulate the movement in the first direction in the visual depiction.

34. The apparatus of claim 32, wherein to control the haptic actuators, the processing system is configured to synchronize the haptic actuators by changing an amplitude of a haptic output of each of the haptic actuators in an order in which the haptic actuators are layered in the first direction in order to simulate the movement in the first direction in the visual depiction.

35. The apparatus of claim 31, wherein a first set of the haptic actuators simulates movement in a first direction and a second set of the haptic actuators simulates movement in a second direction approximately perpendicular to the first direction, wherein to control the haptic actuators, the processing system is configured to control the first set and the second set of the haptic actuators concurrently to simulate a two-dimensional movement in a particular direction in the visual depiction, the particular direction being a direction comprising a combination of at least one of the first direction and the second direction.

36. The apparatus of claim 35, wherein a third set of haptic actuators simulates movement in a third direction approximately perpendicular to the first direction and to the second direction, wherein to control the haptic actuators, the processing system is further configured to control the third set of the haptic actuators concurrently with the first set and the second set of the haptic actuators to simulate a three-dimensional movement in the particular direction in the visual depiction, the particular direction being a direction comprising a combination of at least one of the first direction, the second direction, and the third direction.

37. The apparatus of claim 36, wherein the first set, the second set, and the third set of the haptic actuators each include at least two layered haptic actuators.

38. The apparatus of claim 31, wherein the haptic actuators provide at least one of a vibration, a force, or a texture feedback.

* * * * *